United States Patent
Rosentratter

Patent Number: 5,362,119
Date of Patent: Nov. 8, 1994

[54] GLARE SHIELD

[76] Inventor: Billy F. Rosentratter, 8738 E. Clearview St., Floral City, Fla. 32636

[21] Appl. No.: 128,094

[22] Filed: Sep. 29, 1993

[51] Int. Cl.$^5$ .................................................. B60J 3/02
[52] U.S. Cl. ........................... 296/97.8; 296/97.9; 160/DIG. 3
[58] Field of Search .......... 296/97.1, 97.7, 97.8, 296/97.9; 160/238, 290.1, 313, DIG. 3

[56] References Cited

U.S. PATENT DOCUMENTS

| | | | |
|---|---|---|---|
| Re. 17,735 | 7/1930 | Peterson | 296/97.7 |
| 1,829,924 | 11/1931 | Evertts | 296/97.7 X |
| 2,561,188 | 7/1951 | Ferguson | 160/DIG. 3 |
| 2,594,813 | 4/1952 | Seibert | 160/DIG. 3 X |
| 2,747,927 | 5/1956 | Burkhead | 296/97.8 |
| 3,183,033 | 5/1965 | Stulbach | 296/97.7 X |
| 3,584,910 | 6/1971 | Lupul | 296/97.8 X |
| 4,179,155 | 12/1979 | Ortiz | 160/DIG. 3 X |
| 4,335,773 | 6/1982 | Masi | 160/290.1 X |
| 4,560,251 | 12/1985 | Mürjahn | 296/152 X |
| 4,707,018 | 11/1987 | Gavagan | 296/97.8 X |
| 4,818,007 | 4/1989 | Mahoney | 296/97.7 X |
| 4,921,296 | 5/1990 | Gruber | 296/97.9 X |
| 4,932,710 | 6/1990 | Chen | 296/97.8 X |
| 5,016,937 | 5/1991 | White | 296/97.7 |
| 5,024,479 | 6/1991 | Bryngelson | 296/97.7 |
| 5,085,473 | 2/1992 | Yang | 296/97.8 X |
| 5,089,912 | 2/1992 | Simin | 296/97.2 X |
| 5,205,332 | 4/1993 | Lii | 296/97.8 X |

*Primary Examiner*—Dean J. Kramer
*Attorney, Agent, or Firm*—Michael I. Kroll

[57] ABSTRACT

A glare shield is provided for a truck having a cab with side window in a frame on a door and an outside rear view mirror. The glare shield consists of a casing, with an opaque flexible glare-block sheet extending from the casing. A mechanism within the casing is for retracting the sheet into the casing. A structure is for securing in a removable manner, the casing adjacent to an upper edge of the side window within the cab of the truck. A component is for anchoring in a removable manner, a bottom edge of the sheet to a lower portion of the window frame on the door. This will inhibit the glare of bright headlights reflected by the outside rear view mirror from going through the side window in the cab of the truck and into the eyes of the driver.

3 Claims, 2 Drawing Sheets

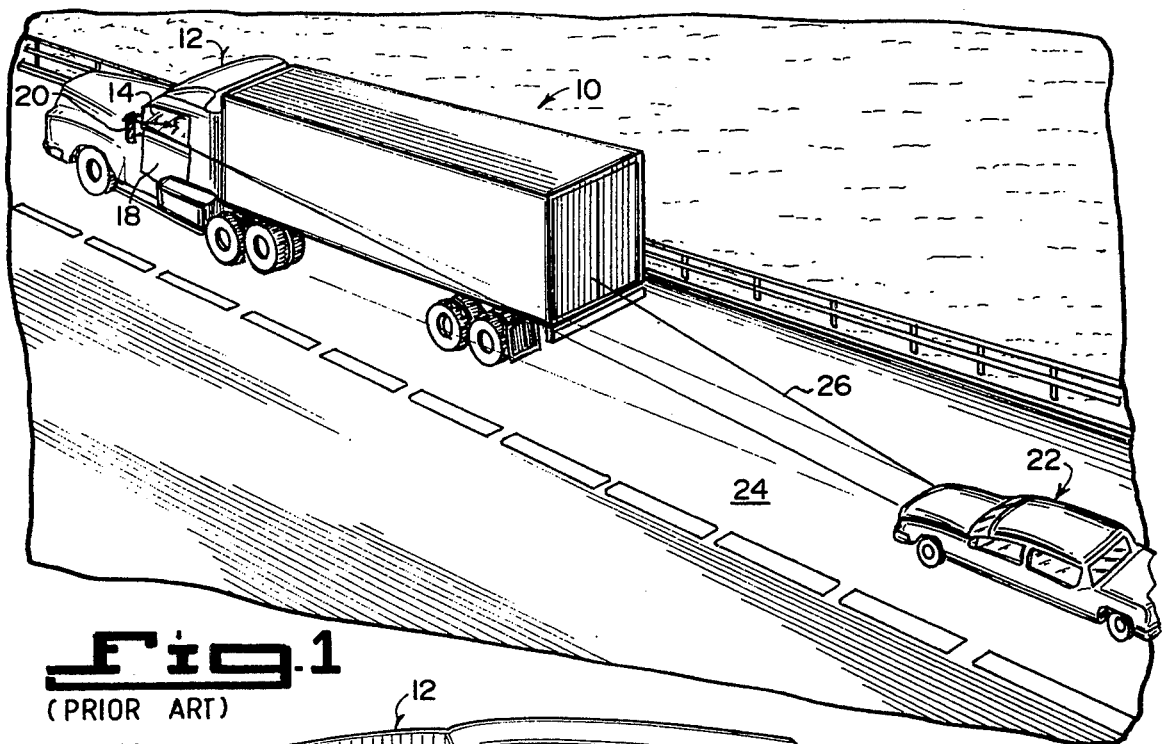
Fig. 1 (PRIOR ART)
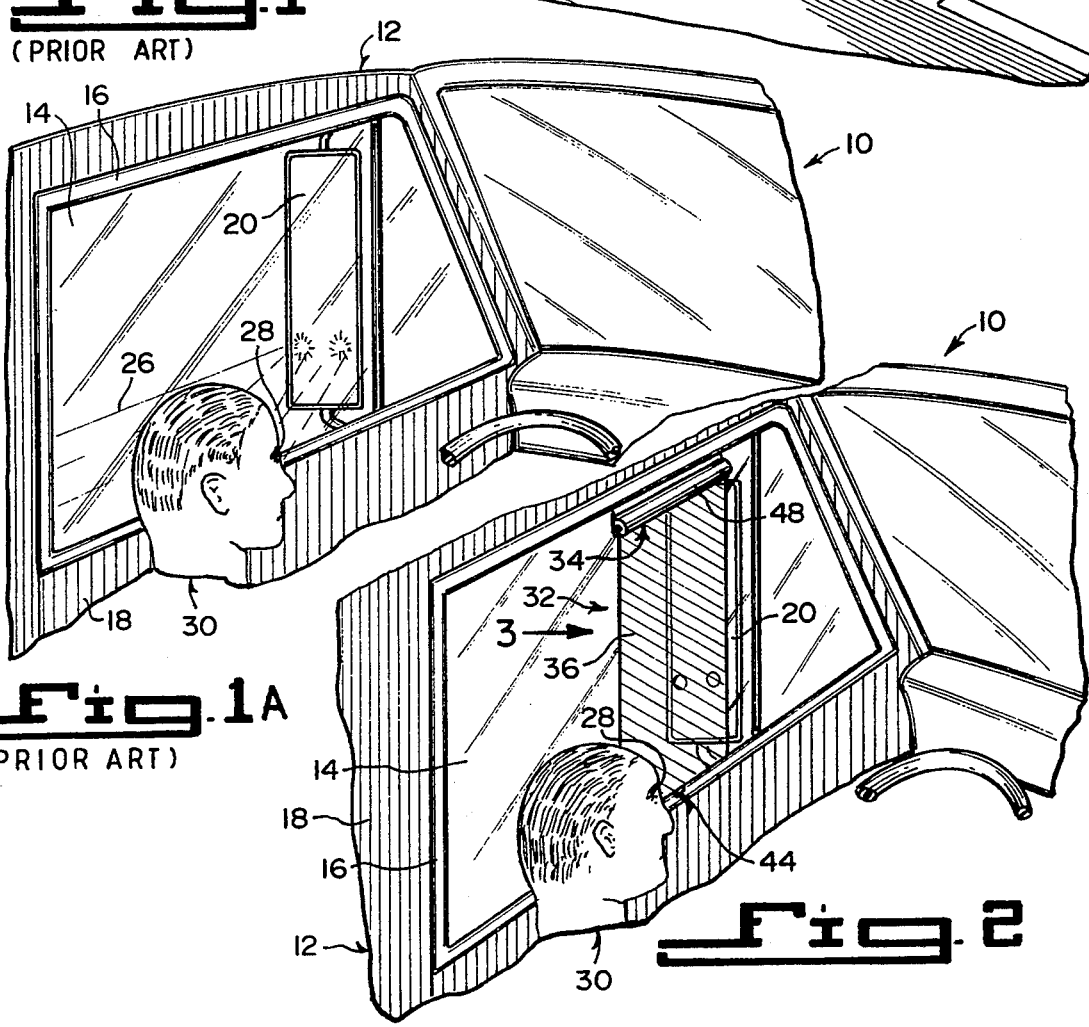
Fig. 1A (PRIOR ART)
Fig. 2

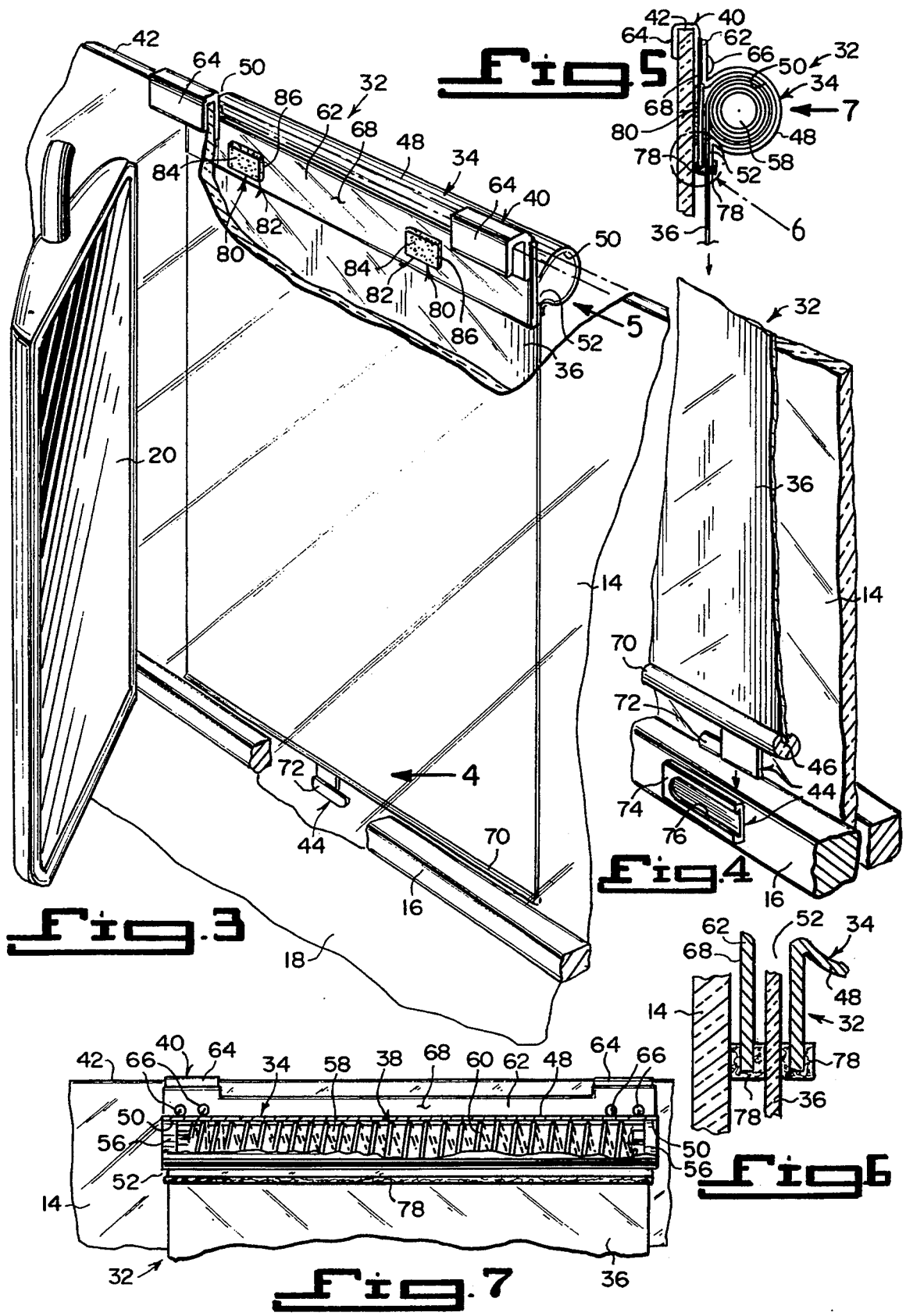

GLARE SHIELD

BACKGROUND OF THE INVENTION

1. Field of the Invention

The instant invention relates generally to motor vehicle shade screens and more specifically it relates to a glare shield.

2. Description of the Prior Art

Numerous motor vehicle shade screens have been provided in prior art. For example, U.S. Pat. Nos. Re. 17,735 to Peterson; 3,183,033 to Stulbach; 4,818,007 to Mahoney; 4,932,710 to Chen; 5,016,937 to White; 5,024,479 to Bryngelson and 5,085,473; to Yang all are illustrative of such prior art. While these units may be suitable for the particular purpose to which they address, they would not be as suitable for the purposes of the present invention as heretofore described.

Peterson, Henry A. AUTOMOBILE GLARE SHIELD U.S. Pat. No. Re. 17,735

The structure comprises bracket arms composed of soft and pliable material, preferably rubber, and provided at one end with suction cups and at their opposite ends with bearing recesses. The suction cups are adapted to frictionally engage the surface of the wind shield glass and the bearing recesses are adapted to receive portions of a perforated plate having a visor for the protection of the driver's eyesight. A spring is provided between the perforated plate and one or both of the bracket arms for holding the plate at a desired position within the arm and also for preventing the plate from vibrating or rattling when the automobile, to which the device is applied, is in motion.

Stulback, Nathan ANTI-GLARE SHIELD FOR MOTOR VEHICLE WINDSHIELDS U.S. Pat. No. 3,183,033

According to the invention there is provided a cylindrical casing in which is a spring biased roller. On the roller is a transparent plastic shield, shade or screen which can be drawn upwardly out of a slot in the roller and secured above a windshield of a vehicle. The shield is preferably pigmented and is darker at its upper end with progressively lighter shades of pigmentation toward its bottom end. Two shields of different colors with progressively decreasing darkness of pigments from top toward the bottom may be wound on the same roller, or the two shields may be wound on two different spring biased rollers in the same casing. The casing may be removably and adjustably secured to a steel dashboard by magnets, brackets or the like. The casing may be mounted on top of a horizontal dashboard or may be mounted underneath the dashboard in a concealed position. The dashboard will then be provided with a slot through which the shield or shields can be withdrawn upwardly to cover the transparent windshield of the vehicle.

Mahoney, Robert VEHICLE SCREEN/SHADE U.S. Pat. No. 4,818,007

A vehicle screen comprising a screen for providing an air flow barrier within the interior of a motor vehicle, the screen including a transparent portion and an opaque portion. The screen is mounted within the interior of the vehicle such that the transparent portion provides no substantial impediment to a driver's visibility. There includes a member for mounting the screen with the vehicle and for retracting the screen about the mounting member. The screen is movable from a first retracted position to a second elongated position. The screen provides a dual function of compartmentalizing the vehicle such that only the driver's compartment would require air conditioning or heating, and secondly provides an opaque sun screen or shade which is placed about the vehicle's windows to prevent sun light from entering the vehicle, thereby cooling the vehicle and protecting the interior from the harmful effects of sunlight and heat.

Chen, Ing-Wen SHADE SCREEN FOR THE WINDOWS OF MOTOR VEHICLES U.S. Pat. No. 4,932,710

A window shade screen is disclosed in combination with the window of a motor vehicle. The screen includes horizontal slats and a tilt plate positioned thereabove. An assembly for associating the tilt plate with the slats is provided, so that tilting of the tilt plate tilts the slats concomitantly therewith. An assembly is also provided for removably securing the tilt plate to the window, so that the screen moves upwardly and downwardly with the window. An assembly is further provided for securing the slats to the tilt plate. Finally, a chamber is provided for receiving all the components of the screen when the screen is not in use.

White, Edward B. SHIELD FOR A VEHICLE WINDSHIELD U.S. Pat. No. 5,016,937

A shield for inhibiting light and heat transfer through the windshield of a vehicle comprises a sheet of substantially rectangular, flexible opaque material. A first stiff, but flexible, elongated rod is attached to the bottom of the sheet of material. This rod and the sheet of material are releasably secured to the vehicle dashboard or the bottom of the vehicle windshield by a suitable fastener to flex the first rod to substantially conform to the inner curve of the vehicle windshield at the bottom. A second stiff elongated rod is attached to the top of the sheet of material, and a hook is provided to releasably attach the second rod to the mounting post for the rear view mirror of the vehicle or to a separate suction cup placed near the top of the vehicle windshield. When the second rod is so attached, the sheet of material substantially covers the inside of the windshield. When the second rod is unhooked from the hook, it may be placed on the dashboard of the vehicle.

Bryngelson, Gaylord D. AUTOMOTIVE SUN SCREEN U.S. Pat. No. 5,024,479

A retractable sun screen for a vehicle windshield, includes a flexible sheet normally rolled up into a helical configuration on a roller located within a tubular housing. The flexible sheet can be unwound from the roller to extend along the windshield, thereby shielding the vehicle interior surfaces from solar rays (and keeping the inside of the vehicle cooler). While the vehicle is being driven the flexible sheet is retracted into the tubular housing.

Yang, De Q. AIR ACTUATED CAR CURTAIN DEVICE U.S. Pat. No. 5,085,473

An air-actuated curtain device for covering the windshield and windows of a vehicle for the purpose of blocking the rays of the sun. The device activates the spring loaded roll-on curtains through compressed air that is forced through a distensible element that is perpendicularly positioned on the curtain sheets with respect to their respective mandrels. The air compressor is controlled by a timer, or a pressure switch, that permits to operate a sufficient amount of time, or reach a predetermined pressure limit, to fully distend the curtain sheets. Upon release of the pressurized air, the curtain sheets come back to their initialed rolled state. Air pressure release valves are used to manually and automatically release the air in the conduits when it exceeds a given pressure.

SUMMARY OF THE INVENTION

A primary object of the present invention is to provide a glare shield that will overcome the shortcomings of the prior art devices.

Another object is to provide a glare shield for inhibiting the glare of bright headlights reflected by an outside rear view mirror from going through a side window in a cab of a truck and into the eyes of the driver.

An additional object is to provide a glare shield that can be rapidly installed and removed from the side window of the cab of the truck.

A further object is to provide a glare shield that is simple and easy to use.

A still further object is to provide a glare shield that is economical in cost to manufacture.

A further object is to provide a glare shield constructed so that it can be rapidly dissembled and assembled by the user for cleaning and changing of the opaque flexible glare-block sheet.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the prior art, showing the glare of bright headlights of an automobile behind a truck reflected by the outside rear view mirror into the cab of the truck.

FIG. 1A is a perspective view of the prior art, showing the interior of the cab with parts broken away with the reflected glare of the bright headlights going into the eyes of the driver.

FIG. 2 is a perspective view similar to FIG. 1A, with the instant invention installed on a side window to block the glare of the bright lights from the outside rear view mirror.

FIG. 3 is an enlarged perspective view taken in the direction of arrow 3 in FIG. 2 with parts broken away, showing the components of the instant invention in greater detail.

FIG. 4 is still a larger perspective view taken in the direction of arrow 4 in FIG. 3, showing the lower anchoring mechanism in greater detail.

FIG. 5 is an end view taken in the direction of arrow 5 in FIG. 3, with parts broken away and in section.

FIG. 6 is an enlarged cross sectional view as indicated by arrow 6 in FIG. 5.

FIG. 7 is a front elevational view taken in the direction of arrow 7 in FIG. 5, with parts broken away and in section.

DETAILED DESCRIPTION OF THE PREFERRED EMBODIMENTS

Turning now descriptively to the drawings, in which similar reference characters denote similar elements throughout the several views, FIGS. 1 and 2 illustrate the prior art, which is a truck 10 having a cab 12 with a side window 14 in a frame 16 on a door 18 and an outside rear view mirror 20. A motor vehicle 22 is traveling behind the truck 10 on a highway 24. The glare of bright head lights 26 are reflected by the outside rear view mirror 20 through the side window 14 in the cab 12 of the truck 10 and into the eyes 28 of the driver 30.

The instant invention as shown in FIGS. 2 through 7, is a glare shield 32 consisting of a casing 34, with an opaque flexible glare-block sheet 36 extending from the casing 34. A mechanism 38 within the casing is for retracting the sheet 36 into the casing 34. A structure 40 is for securing in a removable manner, the casing 34 adjacent to an upper edge 42 of the side window 14 within the cab 12 of the truck 10. A component 44 is for anchoring in a removable manner, a bottom edge 46 of the sheet 36, to a lower portion of the window frame 16 on the door 18. This will inhibit the glare of the bright headlights 26 reflected by the outside rear view mirror 20 from going through the side window 14 in the cab 12 of the truck 10 and into the eyes 28 of the driver 30.

The casing 34 is a generally elongated cylindrical hollow tube 48, having two open ends 50. A longitudinal slotted passageway 52 extends between the open ends 50, so that the sheet 36 can extend through the longitudinal slotted passageway 52. The sleet 36 is fabricated out of a tinted polarized plastic material.

The retracting mechanism 38 includes a pair of end caps 56, each fitting into one open end 50 of the tube 48. An elongated roller 58 is rotatably disposed within the tube 48 on and between the end caps 56. The sheet 36 can be wound on the roller and passes out through the longitudinal slotted passageway 52. A spring 60 is mounted within the tube 48, for biasing the roller 58 against unwinding.

The securing structure 40 consists of an elongated hanger plate 62, integrally formed on one side of the tube 48 and extends upwardly from the longitudinal slotted passageway 52. A pair of hooks 64 are also provided. A plurality of rivets 66 are for attaching the hooks 64 in a spaced apart relationship to a back surface 68 of the hanger plate 62. The hooks 64 can hang onto the upper edge 42 of the side window 14 within the cab 12 of the truck 10.

The anchoring component 44 contains a stiffener strip 70 extending along the bottom edge 46 of the sheet 36. A horizontal tongue 72 projects downwardly from the center of the stiffener strip 70. A bracket 74 having a horizontal groove 76 is affixed to the lower portion of the window frame 16 on the door 18. When the sheet 36 is extended, the tongue 72 can engage with the groove 76 in the bracket 74.

A pair of channel-shaped felt dust wipers are provided, with each affixed along one lower edge at the longitudinal slotted passageway 52. When the sheet 36 is pulled therethrough, the dust wipers will sweep clean opposite surfaces of the sheet 36.

A shock absorber 80 is at the back surface of the hanger plate 62, to prevent the rivets 66 from rubbing and vibrating against the side window 14. The shock absorber 80 includes a pair of pads 82, spaced apart and affixed to the back surface 68 of the hanger plate 62. Each pad 82 is fabricated out of soft rubber material 84 and is affixed to the back surface 68 of the hanger plate 62 with adhesive 86.

LIST OF REFERENCE NUMBERS 10 truck
12 cab on 12
14 side window
16 frame
18 door
20 outside rear view mirror
22 motor vehicle
24 highway
26 bright headlights of 22
28 eye
30 driver
32 glare shield
34 casing
36 opaque flexible glare-block sheet
38 retracting mechanism
40 securing structure
42 upper edge of 14
44 anchoring component
46 bottom edge of 36
48 generally cylindrical hollow tube for 34
50 open end of 48
52 longitudinal slotted passageway
54 titled polarized plastic material for 36
56 end cap
58 elongated roller
60 spring
62 elongated hanger plate
64 hook
66 rivet
68 back surface of 62
70 stiffner strip
72 horizontal tongue on 70
74 bracket on 16
76 horizontal groove in 74
78 channel-shaped felt dust wiper
80 shock absorber
82 pad
84 soft rubber material
86 adhesive It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A glare shield for a truck having a cab with side window in a frame on a door and an outside rear view mirror, said glare shield comprising:

a) a casing, said casing including a generally elongated cylindrical hollow tube having two open ends and a longitudinal slotted passageway extending between said open ends, so that a sheet can extend through said longitudinal slotted passageway;

b) an opaque flexible glare-block sheet extending from said casing, said sheet being fabricated out of a tinted polarized plastic material;

c) means within said casing for retracting said sheet into said casing, said retracting means including a pair of end caps, each fitting into one open end of said tube, an elongated roller rotatably disposed within said tube on and between said end caps, so that said sheet can be wound on said roller and pass out through said longitudinal slotted passageway, and a spring mounted within said tube for biasing said roller against unwinding;

d) means for securing in a removable manner said casing adjacent to an upper edge of the side window within the cab of the truck, said securing means including an elongated hanger plate integrally formed on one side of said tube and extending upwardly from said longitudinal slotted passageway, a pair of hooks, and a plurality of rivets for attaching said hooks in a spaced apart relationship to a back surface of said hanger plate, so that said hooks can hang onto the upper edge of the side window within the cab of the truck;

e) means for anchoring in a removable manner, a bottom edge of said sheet to a lower portion of the window frame on the door, so as to inhibit the glare of bright headlights reflected by the outside rear view mirror from going through the side window in the cab of the truck and into the eyes of the driver, said anchoring means including a stiffener strip extending along the bottom edge of said sheet, a horizontal tongue projecting downwardly from the center of said stiffener strip, and a bracket having a horizontal groove affixed to the lower portion of the window frame on the door, so that when said sheet is extended said tongue can engage with said groove in said bracket;

f) a pair of channel-shaped felt dust wipers, each affixed along one lower edge at said longitudinal slotted passageway, so that when said sheet is pulled therethrough said dust wipers will sweep clean opposite surfaces of said sheet; and g) a shock absorber at the back surface of said hanger plate, to prevent said rivets from rubbing and vibrating against the side window.

2. A glare shield as recited in claim 1, wherein said shock absorber includes a pair of pads spaced apart and affixed to the back surface of said hanger plate.

3. A glare shield as recited in claim 2, wherein each said pad is fabricated out of soft rubber material and is affixed to the back surface of said hanger plate with adhesive.

* * * * *